(12) United States Patent
Miyashita

(10) Patent No.: US 9,307,164 B2
(45) Date of Patent: Apr. 5, 2016

(54) IMAGING LENS BARREL AND METHOD FOR CONTROLLING OPERATION OF THE SAME

(71) Applicant: FUJIFILM Corporation, Tokyo (JP)

(72) Inventor: Mamoru Miyashita, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/625,361

(22) Filed: Feb. 18, 2015

(65) Prior Publication Data

US 2015/0163388 A1   Jun. 11, 2015

Related U.S. Application Data

(63) Continuation of application No. PCT/JP2013/069537, filed on Jul. 18, 2013.

(30) Foreign Application Priority Data

Aug. 30, 2012   (JP) .................................. 2012-189445

(51) Int. Cl.
*H04N 5/238* (2006.01)
*G02B 7/08* (2006.01)
(Continued)

(52) U.S. Cl.
CPC ........... *H04N 5/238* (2013.01); *G01D 5/24485* (2013.01); *G02B 7/08* (2013.01); *G02B 7/10* (2013.01)

(58) Field of Classification Search
CPC ........ G11B 7/0935; G02B 7/02; G02B 7/023; G02B 7/102; G02B 7/08; G02B 7/04; H04N 5/23296; H04N 5/2254; H04N 5/23212
USPC ......... 359/814, 819, 822, 823–825, 813, 694; 396/87.72, 79, 80, 81, 82, 85, 86, 87, 396/529, 530; 324/207.11, 207.13, 207.2, 324/207.21, 207.22, 207.23, 207.24, 324/207.25; 348/240.99, 240.1, 240.2, 348/240.3, 335, 345, 357; 335/2, 87, 91, 335/92, 97, 147
See application file for complete search history.

(56) References Cited

U.S. PATENT DOCUMENTS

2009/0268310 A1 * 10/2009 Honjo ..................... G02B 7/08
359/698

FOREIGN PATENT DOCUMENTS

DE   102005011576 A1 *   9/2006   ......... G01D 5/24476
JP   6-58766              3/1994
(Continued)

OTHER PUBLICATIONS

International Search Report, PCT/JP2013/069537, Aug. 13, 2013.
(Continued)

*Primary Examiner* — Stephone B Allen
*Assistant Examiner* — Rahman Abdur
(74) *Attorney, Agent, or Firm* — Young & Thompson

(57) ABSTRACT

An imaging lens barrel includes: a barrel body; a rotating body including a first magnetic scale and a second magnetic scale; a magnetic sensor device including a first magnetic sensor and a second magnetic sensor; a phase difference calculation section configured to calculate a phase difference between a first phase signal and a third phase signal; a correction table memory configured to store a correction table storing a correction value for correcting a difference between the phase difference and a design value in association with the phase difference; a phase difference correction section configured to read a correction value corresponding to the phase difference calculated by the phase difference calculation section and to correct the phase difference using the read correction value; and an absolute position calculation section configured to calculate an absolute position of the imaging lens.

9 Claims, 17 Drawing Sheets

(51) Int. Cl.
*G01D 5/244* (2006.01)
*G02B 7/10* (2006.01)

(56) References Cited

FOREIGN PATENT DOCUMENTS

| | | |
|---|---|---|
| JP | 2006-29937 | 2/2006 |
| JP | 2008-533476 | 8/2008 |
| JP | 2011-027999 | 2/2011 |
| JP | 2012-083313 | 4/2012 |
| WO | WO 2013076350 * 5/2013 | ............ G02B 27/64 |

OTHER PUBLICATIONS

Written Opinion, PCT/JP2013/069537, Aug. 13, 2013.
Written Opinion of the International Searching Authority in corresponding PCT/JP2013/069537 dated Aug. 13, 2013.

* cited by examiner

FIG. 8

MOVING DIRECTION OF ZOOM LENS : TELEPHOTO → WIDE

| PHASE DIFFERENCE (DEGREES) | 0 ~ 2 | 2 ~ 4 | 4 ~ 6 | .... | 298 ~ 300 |
|---|---|---|---|---|---|
| MAGNETIZATION | 1 | 2 | 3 | .... | 150 |
| AMOUNT OF CORRECTION OF PHASE DIFFERENCE (DEGREES) | Δ1 | Δ2 | Δ3 | .... | Δ150 |

FIG. 10

MOVING DIRECTION OF ZOOM LENS : WIDE → TELEPHOTO

| PHASE DIFFERENCE (DEGREES) | 0 ~ 2 | 2 ~ 4 | 4 ~ 6 | .... | 298 ~ 300 |
|---|---|---|---|---|---|
| MAGNETIZATION | 1 | 2 | 3 | .... | 150 |
| AMOUNT OF CORRECTION OF PHASE DIFFERENCE (DEGREES) | Δ151 | Δ152 | Δ153 | .... | Δ300 |

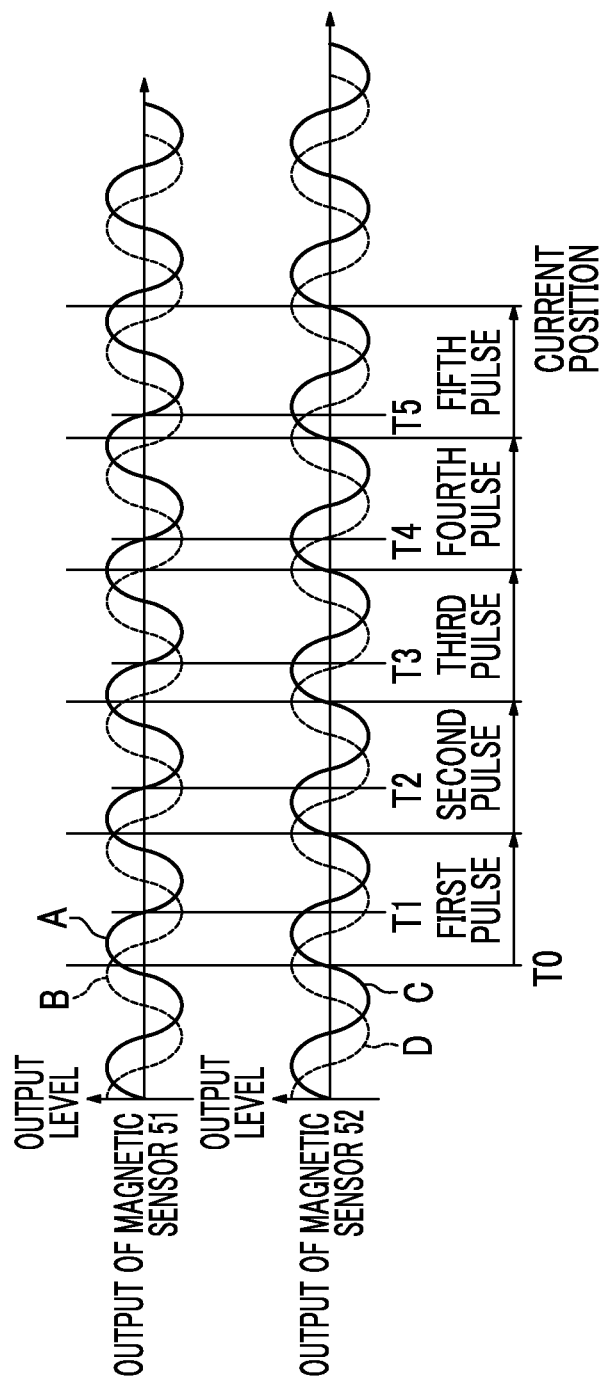

IMAGING LENS BARREL AND METHOD FOR CONTROLLING OPERATION OF THE SAME

CROSS-REFERENCE TO RELATED APPLICATIONS

This application is a Continuation of PCT International Application No. PCT/JP2013/069537 filed on Jul. 18, 2013, which claims priority under 35 U.S.C §119(a) to Japanese Patent Application No. 2012-189445 filed on Aug. 30, 2012. Each of the above applications is hereby expressly incorporated by reference, in its entirety, into the present application.

BACKGROUND OF THE INVENTION

1. Field of the Invention

The claimed invention relates to an imaging lens barrel and a method for controlling an operation of the same.

2. Description of the Related Art

With an increase in the screen size and resolution of a television apparatus, there is an increasing demand for improving the quality of images displayed on a display screen. In order to meet the demand for improving the quality of images, it is necessary to accurately detect the position of an imaging lens provided in movie and broadcasting imaging lens barrels.

For example, JP2011-27999A discloses an endoscopic device which uses an electrostatic encoder as lens position detection means and can determine the position of a lens with high accuracy. For example, JP2012-83313A discloses a position detection device which accurately detects a distance in a wide range with a simple structure and immediately detects an absolute position.

SUMMARY OF THE INVENTION

However, in both JP2011-27999A and JP2012-83313A, the accuracy of detecting the position of the imaging lens is insufficient.

An object of the claimed invention is to provide an imaging lens barrel which can detect the position of an imaging lens with high accuracy and a method of controlling an operation of the imaging lens barrel.

According to an aspect of the claimed invention, an imaging lens barrel includes: a barrel body configured to hold an imaging lens so as to be movable in an optical axis direction; a rotating body configured to rotate in accordance with a movement of the imaging lens and includes a first magnetic scale and a second magnetic scale which are formed in parallel and in which magnetic components with different wavelengths are periodically magnetized in a circumferential direction; a magnetic sensor device that is provided at a position facing a circumferential surface of the rotating body and includes a first magnetic sensor and a second magnetic sensor, the first magnetic sensor being configured to detect, in response to a rotation of the rotating body, from the first magnetic scale, a first phase signal, which is a sine wave, and a second phase signal having a phase shift with respect to the first phase signal, the second magnetic sensor being configured to detect, in response to the rotation of the rotating body, from the second magnetic scale, a third phase signal, which is a sine wave, and a fourth phase signal having a phase shift with respect to the third phase signal; a phase difference calculation section configured to calculate a phase difference between the first phase signal and the third phase signal, using the first phase signal and the second phase signal detected by the first magnetic sensor and the third phase signal and the fourth phase signal detected by the second magnetic sensor; a correction table memory configured to store a correction table storing a correction value for correcting a difference between the phase difference, which is calculated by the phase difference calculation section at a time when the phase of the first phase signal is 0 degrees in response to the rotation of the rotating body, and a design value in association with the phase difference; a phase difference correction section configured to read a correction value corresponding to the phase difference calculated by the phase difference calculation section at a time when the phase of the first phase signal is other degrees than 0 degrees in response to the rotation of the rotating body from the correction table stored in the correction table memory and to correct the phase difference calculated by the phase difference calculation section using the read correction value; and an absolute position calculation section configured to calculate an absolute position of the imaging lens from the phase difference corrected by the phase difference correction section and a predetermined relationship between the phase difference and the absolute position of the imaging lens.

Another aspect of the claimed invention provides an operation control method suitable for an imaging lens barrel. That is, there is provided a method for controlling an operation of an imaging lens barrel including a barrel body configured to hold an imaging lens so as to be movable in an optical axis direction, and a rotating body configured to rotate in accordance with a movement of the imaging lens and includes a first magnetic scale and a second magnetic scale which are formed in parallel and in which magnetic components with different wavelengths are periodically magnetized in a circumferential direction. The method includes: allowing a phase difference calculation section to calculate a phase difference between a first phase signal and a third phase signal, using the first phase signal and a second phase signal detected by a first magnetic sensor and the third phase signal and a fourth phase signal detected by a second magnetic sensor, the first magnetic sensor and the second magnetic sensor being included in a magnetic sensor device which is provided at a position facing a circumferential surface of the rotating body, the first magnetic sensor being configured to detect, in response to a rotation of the rotating body, from the first magnetic scale, the first phase signal, which is a sine wave, and the second phase signal, which has a phase shift with respect to the first phase signal, the second magnetic sensor being configured to detect, in response to the rotation of the rotating body, from the second magnetic scale, the third phase signal, which is a sine wave, and the fourth phase signal, which has a phase shift with respect to the third phase signal; allowing a phase difference correction section to read a correction value corresponding to the phase difference, which is calculated by the phase difference calculation section at a time at which the phase of the first phase signal is not 0 degrees in response to the rotation of the rotating body, from a correction table that is stored in a correction table memory and stores a correction value for correcting a difference between the phase difference, which is calculated by the phase difference calculation section at the time at which the phase of the first phase signal is 0 degrees in response to the rotation of the rotating body, and a design value in association with the phase difference and to correct the phase difference calculated by the phase difference calculation section using the read correction value; and allowing an absolute position calculation section to calculate an absolute position of the imaging lens from the phase difference corrected by the phase difference correction section and a predetermined relationship between the phase difference and the absolute position of the imaging lens.

According to the above-mentioned aspects of the claimed invention, the rotating body is rotated with the movement of the imaging lens. The first magnetic scale and the second magnetic scale in which the magnetic components with different wavelengths are periodically magnetized are formed in parallel in the rotating body. When the rotating body is rotated, the first magnetic sensor detects the first phase signal, which is a sine wave, and the second phase signal having a phase shift with respect to the first phase signal from the first magnetic scale, and the second magnetic sensor detects the third phase signal, which is a sine wave, and the fourth phase signal having a phase shift with respect to the third phase signal from the second magnetic scale. The phase difference between the first phase signal and the third phase signal is calculated using the detected first to fourth phase signals. Since the phase difference and the absolute position of the imaging lens are uniquely determined, the absolute position of the imaging lens is calculated on the basis of the calculated phase difference. In the above-mentioned aspects of the claimed invention, the correction table which stores the correction value for correcting the difference between the phase difference, which is actually calculated when the rotating body is rotated, and the design value so as to be associated with the phase difference is stored. Since the absolute position of the imaging lens is calculated after the calculated phase difference is corrected, it is possible to determine the position of the imaging lens with high accuracy. In particular, in the above-mentioned aspects of the claimed invention, when the correction table is created, the correction value is obtained in correspondence with the phase difference which is obtained at the time when the phase of the first phase signal is 0 degrees. When the phase difference is actually corrected using the correction table to calculate the absolute position of the imaging lens, the phase difference is corrected using the correction value corresponding to the phase difference which is obtained at the time when the phase of the first phase signal is not 0 degrees. The correction table is created in the factory. Therefore, when the correction table is created, the relationship between the phase difference and the correction value is relatively accurate. When correction is performed using the correction table, rattling occurs in the first magnetic scale and the second magnetic scale since the user actually uses the imaging lens barrel. For example, the first phase signal is detected from the magnetic components which are periodically magnetized in the first magnetic scale and the second magnetic scale. In some cases, when the correction value corresponding to the phase difference which is obtained at the time when the phase of the first phase signal is 0 degrees is read from the correction table, the correction value corresponding to the previous phase difference is read from the correction table. According to the above-mentioned aspects of the claimed invention, since the phase difference is corrected using the correction value corresponding to the phase difference which is obtained at the time when the phase of the first phase signal is not 0 degrees, it is possible to prevent the correction value corresponding to the previous phase difference from being read from the correction table.

The phase difference correction section may read a correction value corresponding to the phase difference calculated by the phase difference calculation section at a time when the phase of the first phase signal is 180 degrees in response to the rotation of the rotating body from the correction table stored in the correction table memory and may correct the phase difference calculated by the phase difference calculation section using the read correction value.

The correction table memory may store two correction tables which indicate the difference between the phase difference calculated by the phase difference calculation section and the design value of the phase difference and are obtained when the imaging lens is moved in different directions. In this case, for example, the phase difference correction section may correct the phase difference calculated by the phase difference calculation section using a correction table, which corresponds to the moving direction of the imaging lens, of the two correction tables.

The phase difference correction section may correct the phase difference calculated by the phase difference correction section except for a phase difference which is obtained from a magnetic component with a large magnetization unevenness among the magnetic components magnetized in the first magnetic scale and the second magnetic scale.

The phase difference calculation section may calculate the average of n phase differences among the phase differences which are calculated using the first phase signal and the second phase signal detected by the first magnetic sensor and the third phase signal and the fourth phase signal detected by the second magnetic sensor.

The correction table memory may store, as the correction table, the average of the differences between n phase differences including phase differences corresponding to each movement position of the imaging lens and the design values.

According to the claimed invention, it is possible to detect the position of the imaging lens with high accuracy.

BRIEF DESCRIPTION OF THE DRAWINGS

FIG. 8 illustrates an example of a correction table.

FIG. 10 illustrates an example of the correction table.

FIG. 17 is a diagram illustrating the waveforms of signals output from the magnetic sensor device.

DESCRIPTION OF THE PREFERRED EMBODIMENTS

Figure 1:
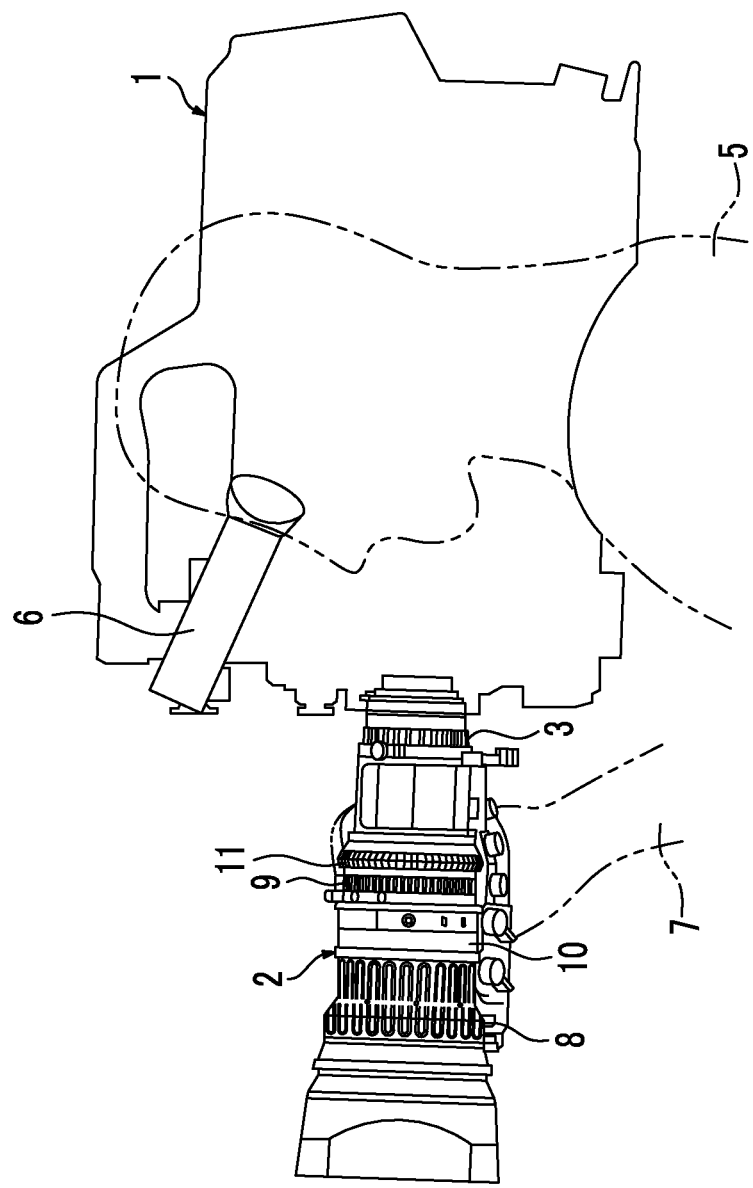
FIG. 1 illustrates the outward appearance of a lens barrel.

FIG. 1 illustrates the usage state of an imaging apparatus provided with a lens barrel (imaging lens barrel) 2 according to an exemplary embodiment of the claimed invention.

The lens barrel 2 includes a cylindrical housing 10 (barrel body). For example, imaging lenses, such as a zoom lens and a focus lens, and an iris are provided in the housing 10. A mount portion 3 is formed in a base portion of the housing 10 of the lens barrel 2. A connection portion of the mount portion 3 is detachably mounted to a lens mount portion which is provided in an anterior part of an imaging apparatus body 1 and the lens barrel 2 is fixed to the imaging apparatus body 1.

An imaging element (not illustrated) is provided in the imaging apparatus body 1 so as to be disposed on the optical axis of the lens barrel 2, with the lens barrel 2 mounted to the imaging apparatus body 1. An optical image which is focused by the lens barrel 2 is captured by the imaging element. An imaging processing device (not illustrated) which is provided in the imaging apparatus body 1 performs predetermined signal processing on an output signal from the imaging element and generates various kinds of image data.

A photographer 5 carries the imaging apparatus body 1 over the right shoulder and looks into a finder device 6 with, for example, the right eye. The photographer 5 photographs an object while holding a holding portion of the lens barrel 2 with the right hand 7 to fix the imaging apparatus.

A focus ring 8 which adjusts the focal position of the focus lens is provided at the leading end (object side) of the lens barrel 2 so as to be rotatable in the outer circumferential direction of the lens barrel 2. The photographer 5 can rotate the focus ring 8 by an arbitrary angle with the right hand 7 to adjust the focal position.

A zoom ring 9 which adjusts the zoom position of the zoom lens is provided in a middle portion of the lens barrel 2 so as to be rotatable in the outer circumferential direction of the lens barrel 2. The photographer 5 can rotate the zoom ring 9 by an arbitrary angle with the right hand 7 to adjust a zoom ratio.

An iris ring 11 for adjusting the opening of the iris is provided at the base end of the zoom ring 9 in the lens barrel 2. The iris ring 11 is also provided so as to be rotatable in the outer circumferential direction of the lens barrel 2.

Figure 2:
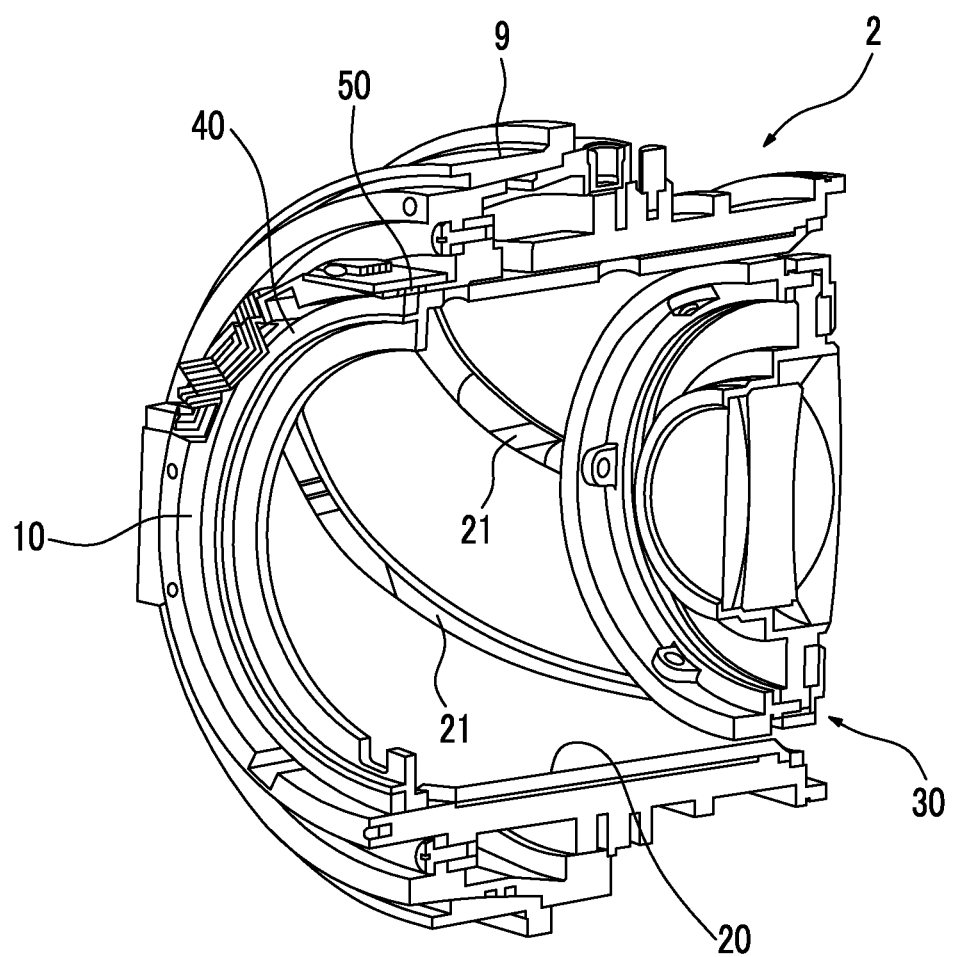
FIG. 2 is a cross-sectional perspective view illustrating a portion of the lens barrel.

FIG. 2 is a cross-sectional perspective view illustrating the vicinity of the zoom ring 9 of the lens barrel 2 illustrated in FIG. 1.

A rotating cylinder 20 (rotating body) which is rotatable about the optical axis of the lens barrel 2 and a zoom lens holding frame 30 which holds the zoom lens provided in the rotating cylinder 20 are provided in the housing 10 having the zoom ring 9 provided in the outer circumference.

The zoom lens holding frame 30 can be moved in the optical axis direction of the lens barrel 2 in operative association with the rotation of the zoom ring 9.

A cam groove 21 for converting a rectilinear motion of the zoom lens holding frame 30 into a rotational motion is formed in the rotating cylinder 20. A protruding portion of the zoom lens holding frame 30 is movably fitted to the cam groove 21. When the zoom lens holding frame 30 is moved in the optical axis direction, the rotating cylinder 20 rotates about the optical axis with the movement of the zoom lens holding frame 30. In this exemplary embodiment, for example, the rotating cylinder 20 can rotate 300 degrees. However, the rotating cylinder 20 may rotate at any angle less than 360 degrees.

A magnetic recording scale member 40 that extends in the circumferential direction of the rotating cylinder 20 is fixed to the outer circumference of the rotating cylinder 20. In this exemplary embodiment, the magnetic recording scale member 40 has a ring shape. However, the magnetic recording scale member 40 may have a shape other than the ring shape. For example, the magnetic recording scale member 40 may have a linear shape with a length corresponding to the rotatable angle of the rotating cylinder 20.

A magnetic sensor device 50 is fixed at a position that faces the magnetic recording scale member 40 in the housing 10.

Figure 3:
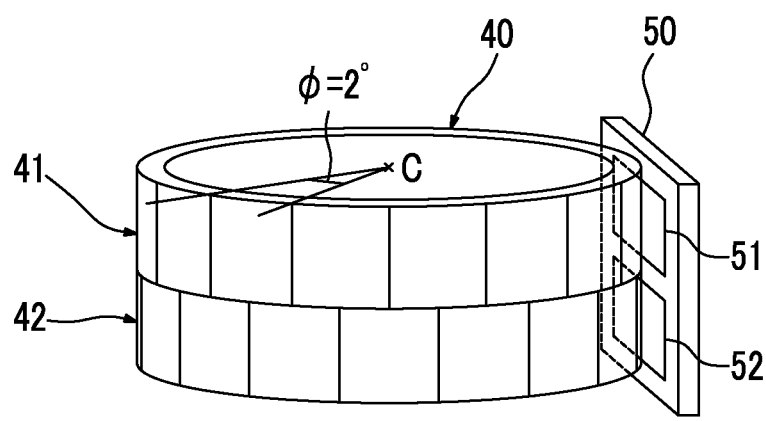
FIG. 3 illustrates a positional relationship between a magnetic scale member and a magnetic sensor device.
Figure 4:
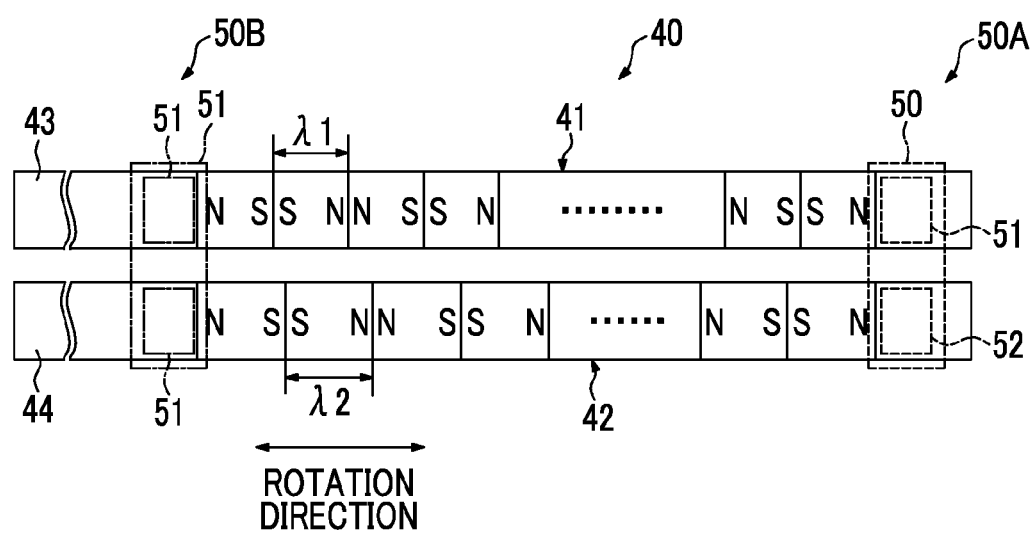
FIG. 4 illustrates a relationship between the magnetic scale member and the magnetic sensor device.

FIG. 3 is an enlarged view illustrating the magnetic recording scale member 40 and the magnetic sensor device 50 illustrated in FIG. 2. FIG. 4 is a development view illustrating the magnetic recording scale member 40 illustrated in FIG. 2.

The magnetic recording scale member 40 includes a first magnetic recording scale 41 and a second magnetic recording scale 42 which are arranged in parallel so as to deviate from each other in the optical axis direction.

As illustrated in FIG. 4, in both the first magnetic recording scale 41 and the second magnetic recording scale 42, magnetic components of the S-pole which is represented by letter S and the N-pole which is represented by letter N are periodically magnetized in supports 43 and 44, respectively. Sine wave information with a wavelength λ1 is recorded as magnetic information on the first magnetic recording scale 41 and sine wave information with a wavelength λ2 greater than the wavelength λ1 is recorded as magnetic information on the second magnetic recording scale 42.

As illustrated in FIG. 3, an angle φ formed between one magnetic pole of the first magnetic recording scale 41 and the center C of the magnetic recording scale member 40 is 2 degrees.

The magnetic sensor device 50 includes a first magnetic sensor 51 that is provided at a position facing the first magnetic recording scale 41 and a magnetic sensor 52 that is provided at a position facing the second magnetic recording scale 42.

The first magnetic sensor 51 includes two magneto-resistive effect elements whose electric resistance is changed depending on the magnetic field applied, detects a sine wave signal with the wavelength λ1 and a cosine wave signal having a phase shift of, for example, 90° with respect to the sine wave signal from the magnetic information recorded on the first magnetic recording scale 41, and outputs the detected signals. Similarly, the second magnetic sensor 52 includes two magneto-resistive effect elements whose electric resistance is changed depending on the magnetic field applied, detects a sine wave signal with the wavelength λ2 and a cosine wave signal having a phase shift of, for example, 90° with respect to the sine wave signal from the magnetic information recorded on the second magnetic recording scale 42, and outputs the detected signals.

In FIG. 4, the position of the magnetic sensor device 50 relative to the magnetic recording scale member 40 when the rotation angle of the rotating cylinder 20 is 0° (or 360°) (for example, the zoom lens is disposed at the wide end) is represented by a dashed line indicated by an arrow 50A. When the rotating cylinder 20 is rotated, the magnetic sensor device 50 relatively moves from the position represented by the dashed line indicated by the arrow 50A in FIG. 4 to the left. When the rotation angle of the rotating cylinder 20 is 300° (or 0°), the magnetic sensor device 50 is relatively disposed at the position represented by a chain line indicated by an arrow 50B. As such, the magnetic sensor device 50 is relatively moved between first magnetization to 150-th magnetization.

Figure 5:
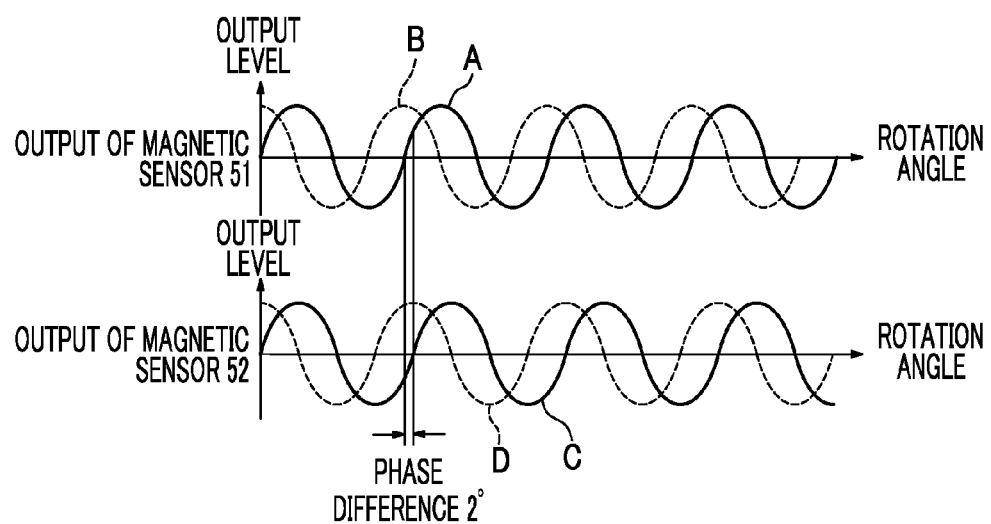
FIG. 5 is a diagram illustrating the waveforms of signals output from the magnetic sensor device.

FIG. 5 is a diagram illustrating the waveforms of signals output from the magnetic sensor device 50 when the rotating cylinder 20 illustrated in FIG. 2 is rotated.

In FIG. 5, waveforms represented by letters A and B (hereinafter, referred to as an A-phase and a B-phase) are signal waveforms which are output from the first magnetic sensor 51 facing the first magnetic recording scale 41. The B-phase has a phase shift of 90° with respect to the A-phase. That is, the A-phase is an example of a first phase signal and the B-phase is an example of a second phase signal.

In FIG. 5, waveforms represented by letters C and D (hereinafter, referred to as a C-phase and a D-phase) are signal waveforms which are output from the second magnetic sensor 52 facing the second magnetic recording scale 42. The C-phase has the same phase as the A-phase at the beginning. However, the C-phase leads the A-phase by 2° in every cycle (one pulse). In addition, the D-phase has a phase shift of 90° with respect to the C-phase. That is, the C-phase is an example of a third phase signal and the D-phase is an example of a fourth phase signal.

In this exemplary embodiment, the first magnetic recording scale 41 and the second magnetic recording scale 42 are magnetized such that 150 pulses of the A-phase and the B-phase are output and 149 pulses of the C-phase and the D-phase are output while the rotating cylinder 20 is being rotated 300°.

When the lens diameter of a general broadcasting lens device is considered, the diameter φ of the first magnetic recording scale 41 and the second magnetic recording scale 42 is about 80 mm in practice. The wavelength λ1 and the wavelength λ2, which are magnetization pitches, may be respectively about 1.40 mm and 1.41 mm in order to obtain the above-mentioned number of pulses with the diameter.

Figure 6:
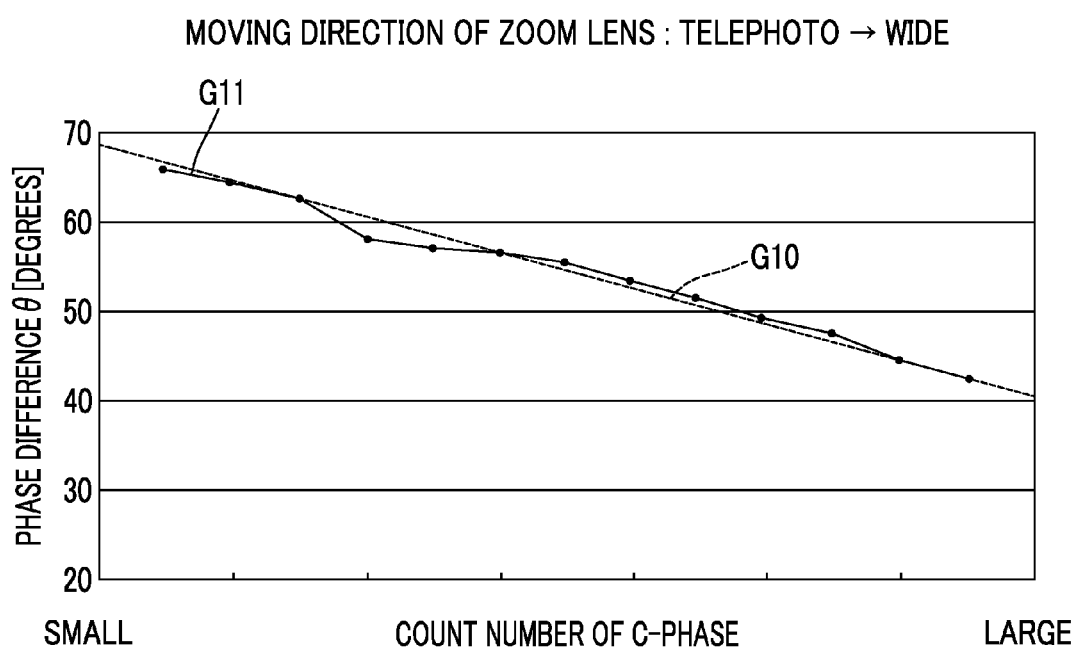
FIG. 6 illustrates a relationship between a phase difference and the count number of a C-phase.
Figure 7:
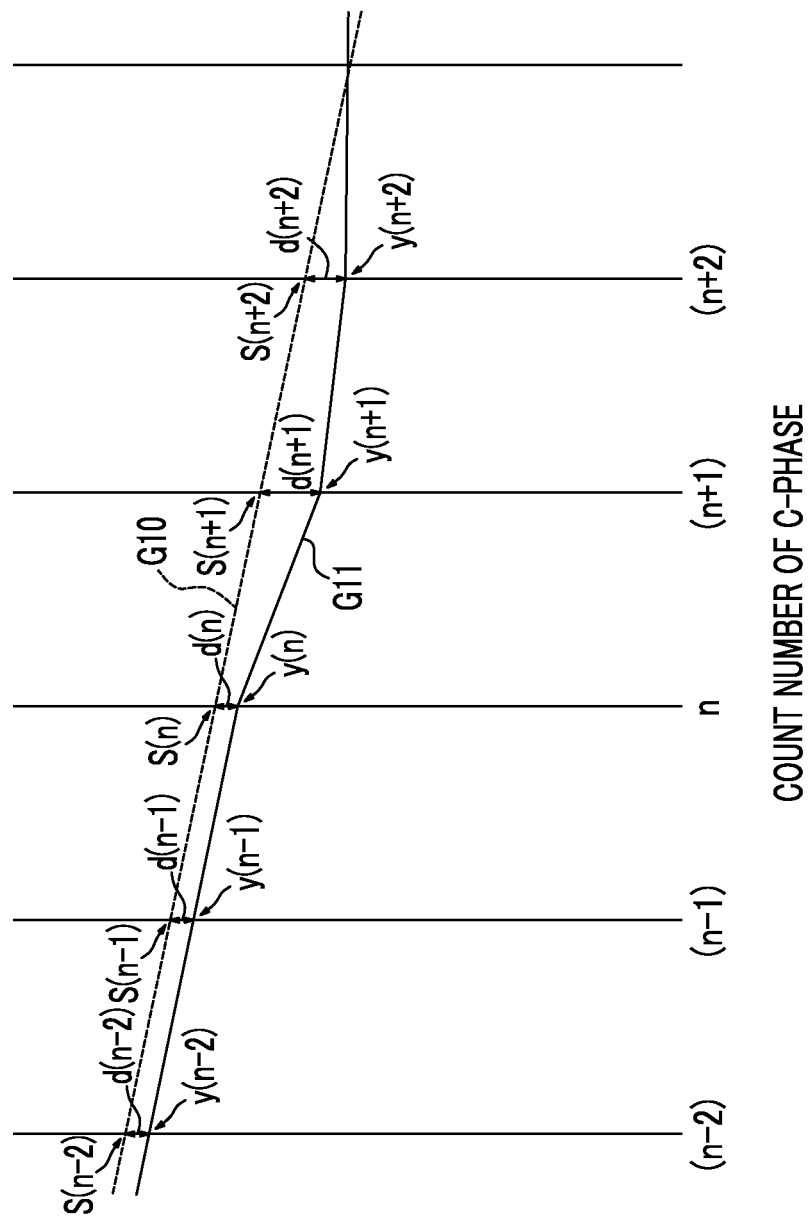
FIG. 7 illustrates the relationship between the phase difference and the count number of the C-phase.

FIG. 6 illustrates a portion of the relationship between the count number of the C-phase and a phase difference θ between the A-phase and the C-phase when the zoom lens is moved from a telephoto side to a wide side. FIG. 7 is an enlarged view illustrating a portion of FIG. 6.

In FIG. 6, the horizontal axis is the count number of the C-phase and the vertical axis is the phase difference θ between the A-phase and the C-phase. The phase difference θ between the A-phase and the C-phase is obtained by, for example, arctan(A/B)−arctan(C/D) (A, B, C, and D are the signal levels of each phase which are obtained at an arbitrary time). The count number of the C-phase corresponds to the rotation angle of the zoom lens holding frame 30 (therefore, corresponds to the position of the zoom lens). When the phase difference θ is known, the count number of the C-phase, that is, the position of the zoom lens is known.

In FIG. 6, a dashed line G10 indicates an ideal design value without any error. The phase difference θ decreases gradually as the count number of the C-phase increases. In FIG. 6, a solid line G11 indicates an actual value when the magnetic recording scale member 40 which is magnetized as described above is rotated. For example, when the magnetic recording scale member 40 is actually provided in the lens barrel 2, uneven magnetization occurs. Therefore, the relationship between the phase difference θ and the count number of the C-phase is not equal to the ideal design value.

It is assumed that, for example, the phase differences θ at the ideal design values when the count numbers are (n−2), (n−1), n, (n+1), and (n+2) are S(n−2), S(n−1), S(n), S(n+1), and S(n+2), respectively, with reference to FIG. 7. However, the actual phase differences θ when the count numbers are (n−2), (n−1), n, (n+1), and (n+2) are y(n−2), y(n−1), y(n), y(n+1), and y(n+2), respectively.

The differences between the design values and the actual phase differences θ when the count numbers are (n−2), (n−1), n, (n+1), and (n+2) are d(n−2), d(n−1), d(n), d(n+1), and d(n+2), respectively.

In this exemplary embodiment, as represented by a graph G10, data indicating the relationship between the count number and the phase difference θ at the ideal design value (the relationship between the phase difference and the absolute position of the imaging lens) is stored in advance and the difference between the phase difference θ and the design value is stored as the amount of correction for each phase difference in advance. In particular, in this exemplary embodiment, for the amount of correction indicating the difference between the phase difference θ and the design value, the average of the amounts of correction of the phase differences corresponding to five consecutive count numbers is stored.

FIG. 8 illustrates an example of a correction table storing the amount of correction.

FIG. 8 illustrates the correction table used when the zoom lens is moved from the telephoto side to the wide side, similarly to FIGS. 6 and 7.

As described above, since a C-phase signal lags an A-phase signal by 2 degrees in each cycle, the phase difference between the C-phase signal and the A-phase signal in the first magnetization is in the range of 0 degrees to 2 degrees, the phase difference between the C-phase signal and the A-phase signal in the second magnetization is in the range of 2 degrees to 4 degrees, and the phase difference between the C-phase signal and the A-phase signal in the third magnetization is in the range of 4 degrees to 6 degrees. In the other magnetization, similarly, the phase difference between the C-phase signal and the A-phase signal in the 150-th magnetization is in the range of 298 degrees to 300 degrees.

In this exemplary embodiment, the amount of correction of the phase difference is calculated on the basis of the phase difference. For example, when the phase differences are in the range of 0 degrees to 2 degrees, the range of 2 degrees to 4 degrees, and the range of 4 degrees to 6 degrees, the amounts of correction of the phase differences are Δ1, Δ2, and Δ3, respectively. As described above, for the amounts of correction of the phase differences, the average of the amounts of correction of five consecutive phase differences is stored in the correction table. For example, the amount of correction Δ3 of the phase difference in the range of 4 degrees to 6 degrees is the average of the difference between the design value and the phase difference when the phase difference is in the range of 0 degrees to 2 degrees, the difference between the design value and the phase difference when the phase difference is in the range of 2 degrees to 4 degrees, and the difference between the design value and the phase difference when the phase difference is in the range of 4 degrees to 6 degrees, the difference between the design value and the phase difference when the phase difference is in the range of 6 degrees to 8 degrees, and the difference between the design value and the phase difference when the phase difference is in the range of 8 degrees to 10 degrees. In addition, the amount of correction of the phase difference may be calculated in correspondence with the count number of the C-phase and may be stored in the correction table.

In this exemplary embodiment, the average of five differences between the design values and the phase differences θ corresponding to five consecutive count numbers is used as the amount of correction. Therefore, even when an error occurs, averaging is performed to detect the position of the zoom lens with high accuracy. In addition, the average of five differences between the design values and the phase differences θ corresponding to five consecutive count numbers may not be used as the amount of correction.

Figure 9:
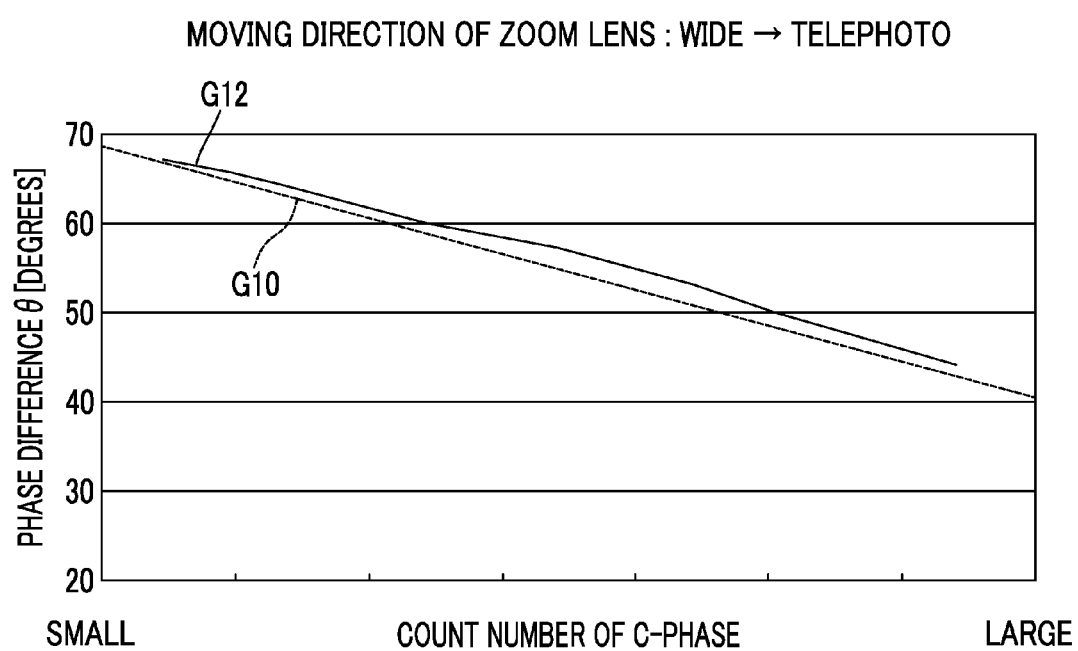
FIG. 9 illustrates the relationship between the phase difference and the count number of the C-phase.

FIG. 9 illustrates a portion of the relationship between the count number of the C-phase and the phase difference θ between the A-phase and the C-phase when the zoom lens is moved from the wide side to the telephoto side, contrary to the case illustrated in FIG. 6.

FIG. 9 illustrates a graph G10 of the design values in addition to a graph G12 obtained when the zoom lens is actually moved from the wide side to the telephoto side.

The relationship between the count number and the phase difference θ when the zoom lens is moved from the telephoto side to the wide side is not completely identical to that when the zoom lens is moved from the wide side to the telephoto side. Therefore, in this exemplary embodiment, the above-mentioned correction is performed according to the moving direction of the zoom lens.

FIG. 10 illustrates a correction table used when the zoom lens is moved from the wide side to the telephoto side.

In the table illustrated in FIG. 10, the amount of correction is stored so as to be associated with the phase difference, similarly to the table illustrated in FIG. 8.

Figure 11:
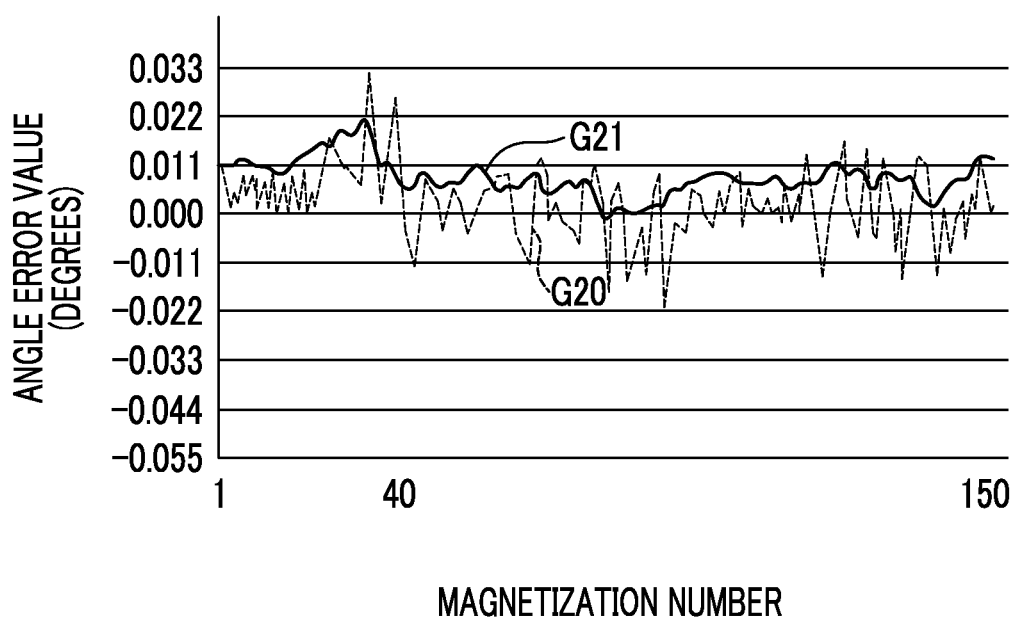
FIG. 11 illustrates a relationship between an angle error value and a magnetization number.

FIG. 11 illustrates the relationship between an angle error value and the magnetization number of the magnetic component magnetized in the first magnetic recording scale 41.

In FIG. 11, a dashed line graph G20 indicates actual data and a solid line graph G21 indicates the average of angle error values for eight consecutive magnetization numbers.

In the example illustrated in FIG. 11, there is a large error in the vicinity of 40-th magnetization. In this exemplary embodiment, a correction process is not performed in the vicinity of magnetization with a large error since the vicinity of the magnetization is not reliable.

Figure 12:
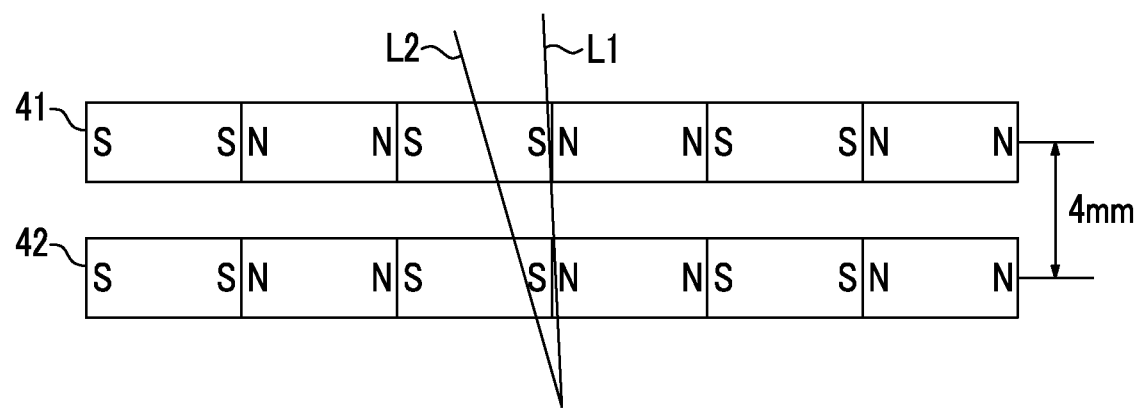
FIG. 12 illustrates a magnetic scale.

FIG. 12 illustrates the first magnetic recording scale 41 and the second magnetic recording scale 42.

Solid lines L1 and L2 indicate directions in which the first magnetic recording scale 41 and the second magnetic recording scale 42 face the magnetic sensor device 50.

When there is no rattling in a mechanism forming the lens barrel 2 and there is no positional deviation between the magnetic sensor device 50 and the first and second magnetic recording scales 41 and 42, a line connecting the centers of the first magnetic sensor 51 and the second magnetic sensor 52 forming the magnetic sensor device 50 is perpendicular to the rotation direction of the first magnetic recording scale 41 and the second magnetic recording scale 42, as represented by the solid line L1. However, when there is rattling in the mechanism forming the lens barrel 2, the line connecting the centers of the first magnetic sensor 51 and the second magnetic sensor 52 forming the magnetic sensor device 50 slightly deviates from the direction perpendicular to the rotation direction of the first magnetic recording scale 41 and the second magnetic recording scale 42, as represented by the solid line L2.

When the length (wavelength λ1) of a magnetized segment forming the first magnetic recording scale 41 is 1.4 mm and the positional deviation is 7.5 μm in the first magnetic recording scale 41, it is difficult to distinguish the magnetized component from an adjacent magnetized component. That is, in this exemplary embodiment, the phase difference between the A-phase signal obtained from the first magnetic recording scale 41 and the C-phase signal obtained from the second magnetic recording scale 42 is detected. When the position of the zoom ring 9 (the position of the zoom lens) is detected on the basis of the detected phase difference, the detected phase difference is corrected. However, when the first magnetic recording scale 41 (second magnetic recording scale 42) and the magnetic sensor device 50 deviate from each other as described above, it is difficult to detect the phase difference. Therefore, it is difficult to correct the phase difference on the basis of the phase difference.

In this exemplary embodiment, when the above-mentioned correction table is created, the phase difference between the A-phase signal and the C-phase signal is detected at the time when the phase of the A-phase signal is 0 degrees. However, when the phase difference is corrected using the correction table, the phase difference between the A-phase signal and the C-phase signal is detected at the time when the phase of the A-phase signal is 180 degrees (the phase of the A-phase signal may not be 180 degrees or the phase of the A-phase signal may be any angle different from 0 degrees). The correction table is created in the factory before the shipment of the lens barrel 2. Therefore, the correction table is accurately created such that rattling does not occur in the lens barrel 2. In contrast, when correction is performed using the correction table, the lens barrel 2 is actually used. In some cases, the magnetic sensor device 50 is inclined with respect to the first magnetic recording scale 41 (second magnetic recording scale 42) due to the rattling of the lens barrel 2, as represented by the solid line L2, and the phase difference between the A-phase signal and the C-phase signal obtained from a magnetic pole that is arranged before (or after) the magnetic pole, from which the phase difference is to be originally detected, is detected. In this exemplary embodiment, when the phase difference is corrected using the correction table, the phase difference between the A-phase signal and the C-phase signal is detected at the time when the phase of the A-phase signal is 180 degrees. Therefore, even when the magnetic sensor device 50 is inclined with respect to the first magnetic recording scale 41 (second magnetic recording scale 42), it is possible to detect the phase difference between the A-phase signal and the C-phase signal obtained from the magnetic pole from which the phase difference is to be originally detected.

Figure 13:
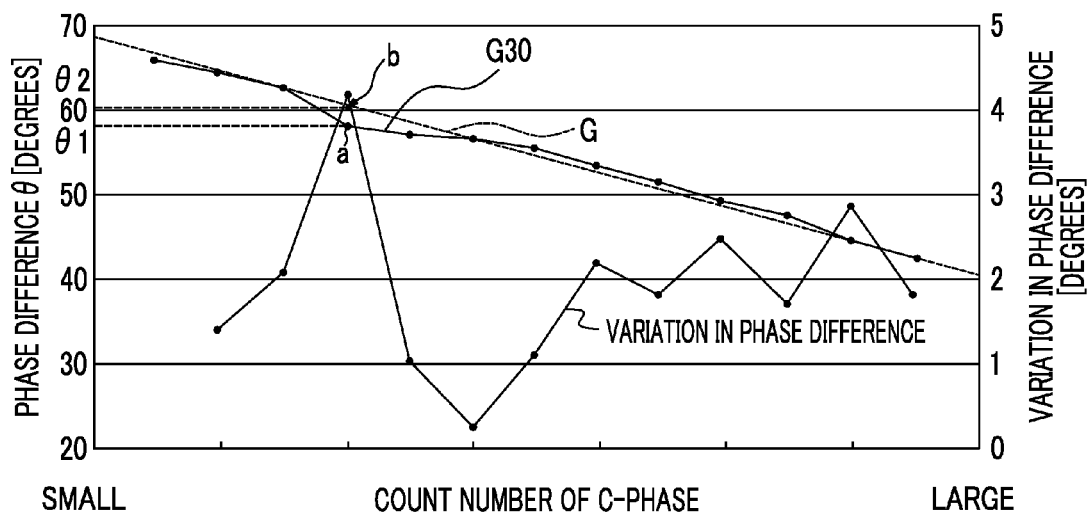
FIG. 13 illustrates the relationship between the phase difference and the count number of the C-phase.

FIG. 13 illustrates the relationship between the phase difference and the count number of the C-phase when the position of the zoom lens is actually detected. In addition, FIG. 13 illustrates a variation in the phase difference in correspondence with the count number of the C-phase.

A graph G indicates a design phase difference value and the count number of the C-phase. A graph G30 indicates the relationship between the phase difference and the count number obtained according to the movement of the zoom lens when the phase difference is actually corrected.

The relationship between the phase difference and the count number obtained according to the movement of the zoom lens when the correction is performed is not identical to a design relationship. For example, when a phase difference θ1 is obtained as represented by a point "a" and the count number of the C-phase (the position of the zoom lens) is calculated on the basis of the phase difference θ1, using the graph a position P2 is calculated as the position of the zoom lens even though the actual position of the zoon lens is a position P1. This error may not be corrected even though the correction process is performed.

Therefore, in this exemplary embodiment, the phase difference θ is calculated for each of the five count numbers of the C-phase (when the number of counts is two or more, it may not be five) and the average value of the calculated phase differences θ is calculated. Then, the position of the zoom lens is detected from the average phase difference.

In FIG. 13, the average value of a total of five phase differences, that is, the phase difference θ1 and four phase differences before and after the phase difference θ1 is calculated. When the average value is replaced with the phase difference θ1 at the point "a", the phase difference at the point "a" becomes a phase θ2 at a point "b" and is close to the design value. Therefore, when the average value θ2 is used, it is possible to improve the detection accuracy of the position of the zoom lens. The average value θ2 is corrected with the above-mentioned correction table and the position of the zoom lens is detected.

Figure 14:
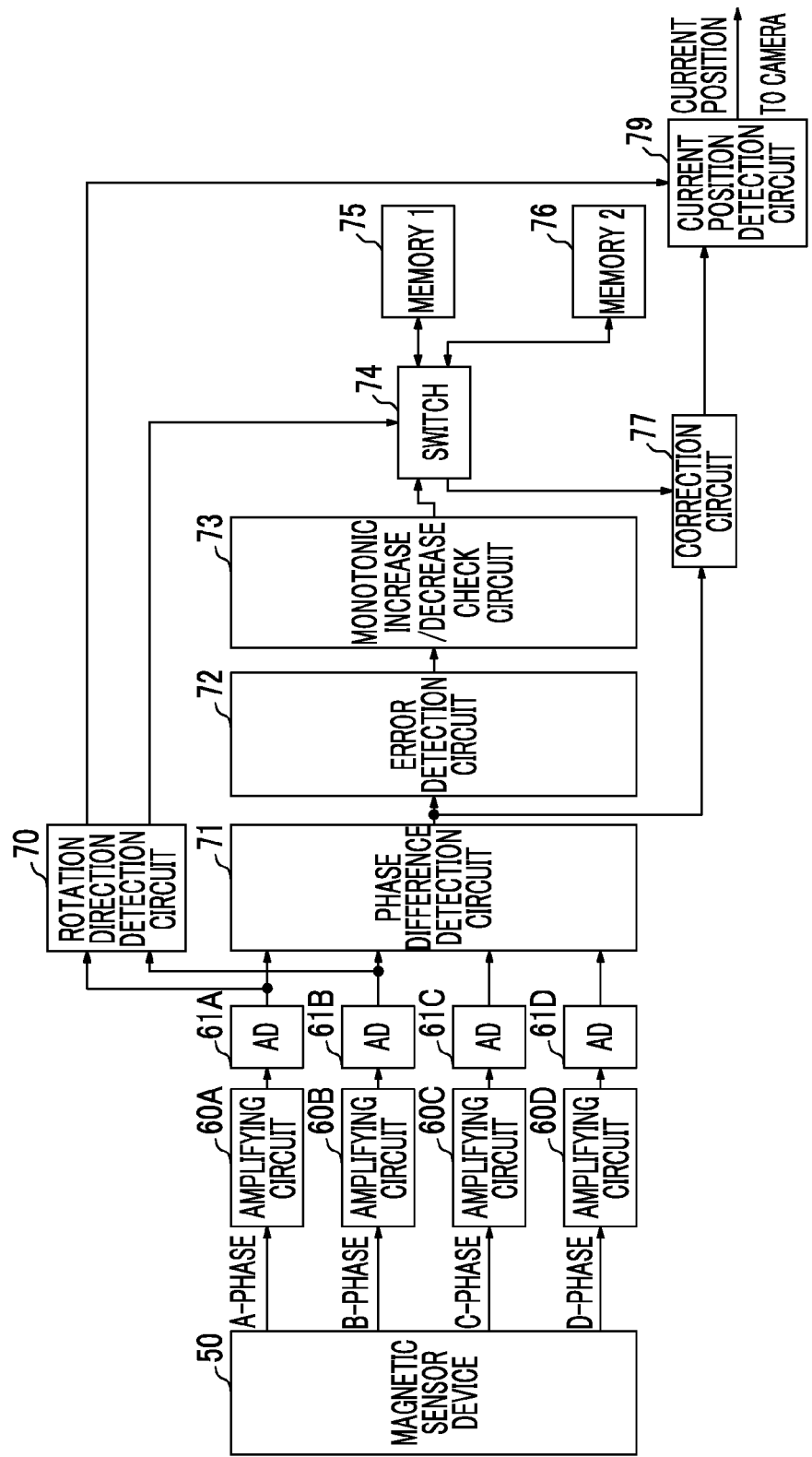
FIG. 14 is a block diagram illustrating the electrical structure of a zoom lens position detection circuit.

FIG. 14 is a block diagram illustrating the electrical structure of a circuit for detecting the position of the zoom lens holding frame 30 (zoom lens) illustrated in FIG. 2. The circuit illustrated in FIG. 14 is provided in the lens barrel 2.

First, a method for generating the correction tables illustrated in FIGS. 8 and 10 as described above will be described.

At the time of the factory shipment of the lens barrel 2, the zoom ring 9 is rotated such that the zoom lens moves from the telephoto side to the wide side. Then, as described above, the A-phase signal and the B-phase signal are output from the first magnetic sensor 51 of the magnetic sensor device 50 and the C-phase signal and the D-phase signal are output from the second magnetic sensor 52.

The A-phase signal and the B-phase signal output from the first magnetic sensor 51 are input to a first amplifying circuit 60A and a second amplifying circuit 60B, respectively, and are then amplified. The amplified A-phase signal and B-phase signal are converted into digital A-phase data and digital B-phase data by analog/digital conversion circuits 61A and 61B, respectively. The converted A-phase data and B-phase data are input to a phase difference detection circuit 71 and a rotation direction detection circuit 70. The rotation direction detection circuit 70 detects the rotation direction of the zoom ring 9 (that is, the moving direction of the zoom lens) from the input A-phase data and B-phase data.

The C-phase signal and the D-phase signal output from the second magnetic sensor 52 are input to a third amplifying circuit 60C and a fourth amplifying circuit 60D, respectively. The amplified C-phase signal and D-phase signal are converted into digital C-phase data and digital D-phase data by analog/digital conversion circuits 61C and 61D, respectively. The converted C-phase data and D-phase data are input to the phase difference detection circuit 71.

As described above, the phase difference detection circuit 71 periodically detects the phase difference θ between the A-phase and the C-phase at the time when the phase of the A-phase data is 0 degrees. As described above, the value of arctan(A/B)−arctan(C/D) (A, B, C, and D are the levels of each phase which are acquired at an arbitrary time) is calculated and the phase difference θ is calculated. That is, the phase difference detection circuit 71 functions as an example of the phase difference calculation section.

Data indicating the detected phase difference θ is input to an error detection circuit 72. The error detection circuit 72 obtains data indicating the difference between the design value and the phase difference. The data indicating the difference between the design value and the phase difference is input to a monotonic increase/decrease check circuit 73. The data indicating the phase difference θ which is output from the phase difference detection circuit 71 simply passes through the error detection circuit 72 and is then input to the monotonic increase/decrease check circuit 73. The monotonic increase/decrease check circuit 73 regards a portion of the data indicating the phase difference θ, which does not monotonically increase or decrease, as data with a large magnetization error, as illustrated in FIG. 11. Therefore, for the data indicating the difference between the phase difference and the design value corresponding to the portion that does not monotonically increase or decrease, "false" is stored in the correction table such that the data is not used for the correction. The data indicating the difference between the phase difference and the design value corresponding to the portion that does not monotonically increase or decrease is given as the amount of correction to a first memory 75 through a switch circuit 74. The amounts of correction corresponding to different phase differences are obtained and the correction table illustrated in FIG. 8 is stored in the first memory 75.

Then, the zoom lens is moved from the wide side to the telephoto side and the correction table illustrated in FIG. 10 is obtained as described above. The obtained correction table is stored in a second memory 76. That is, the first memory 75 and the second memory 76 function as an example of a correction table memory.

Next, the correction process will be described with reference to FIG. 14.

When the zoom ring 9 is rotated during the actual use of the lens barrel 2, the A-phase signal and the B-phase signal output from the first magnetic sensor 51 and the C-phase signal and the D-phase signal output from the second magnetic sensor 52 are converted into digital A-phase data, digital B-phase data, digital C-phase data, and digital D-phase data by the analog/digital conversion circuits 61A, 61B, 61C, and 61D, respectively.

Among the A-phase data, the B-phase data, the C-phase data, and the D-phase data, the A-phase data and the B-phase data are input to the rotation direction detection circuit 70. The rotation direction detection circuit 70 detects the rotation direction. Whether the zoom lens is moved from the telephoto side to the wide side or from the wide side to the telephoto side is known from the detected rotation direction. A correction table corresponding to the rotation direction (the moving direction of the zoom lens) detected by the rotation direction detection circuit 70 is read from the first memory 75 or the second memory 76 and passes through the switch circuit 74. For example, when the moving direction of the zoom lens is from the telephoto side to the wide side, the correction table illustrated in FIG. 8 is input to a correction circuit 77 through the switch circuit 74. When the moving direction of the zoom lens is from the wide side to the telephoto side, the correction table illustrated in FIG. 10 is input to the correction circuit 77 through the switch circuit 74.

The phase difference detection circuit 71 calculates the phase difference θ between the A-phase and the C-phase at the time when the phase of the A-phase data is 180 degrees, as described above. Data indicating the phase difference θ output from the phase difference detection circuit 71 is also input to the correction circuit 77 and the correction circuit 77 corrects the input data indicating the phase difference θ with the correction table. That is, the correction circuit 77 functions as an example of the phase difference correction section. The corrected data indicating the phase difference θ is input to a current position detection circuit 79 and the current position of the zoom lens is detected on the basis of a graph G10 indicating the relationship between the phase difference and the count number of the C-phase at the ideal design value. Next, a method for detecting the current position of the zoom lens will be described.

Figure 15:
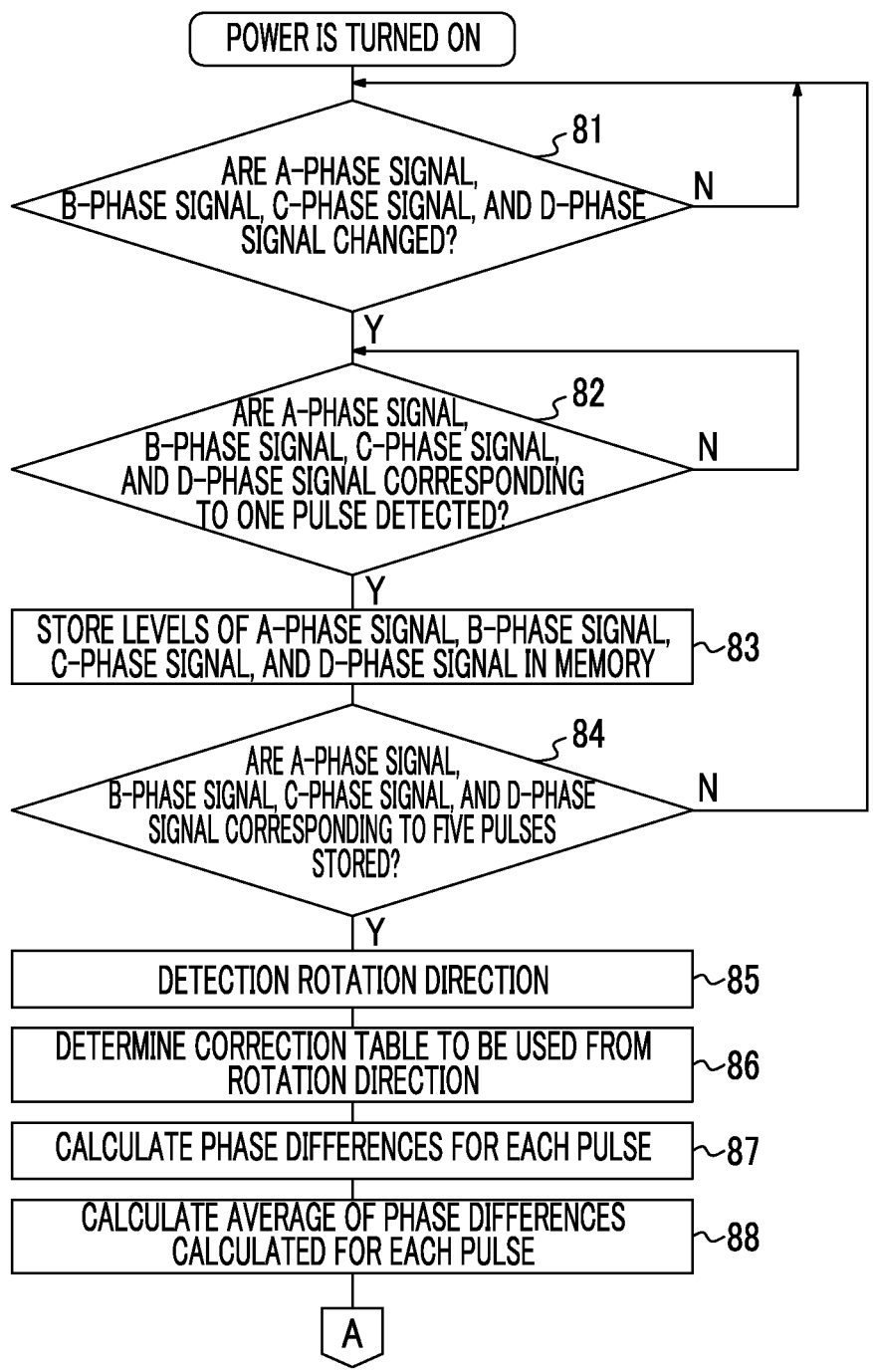
FIG. 15 is a flowchart illustrating the procedure of a zoom lens position detection process.
Figure 16:
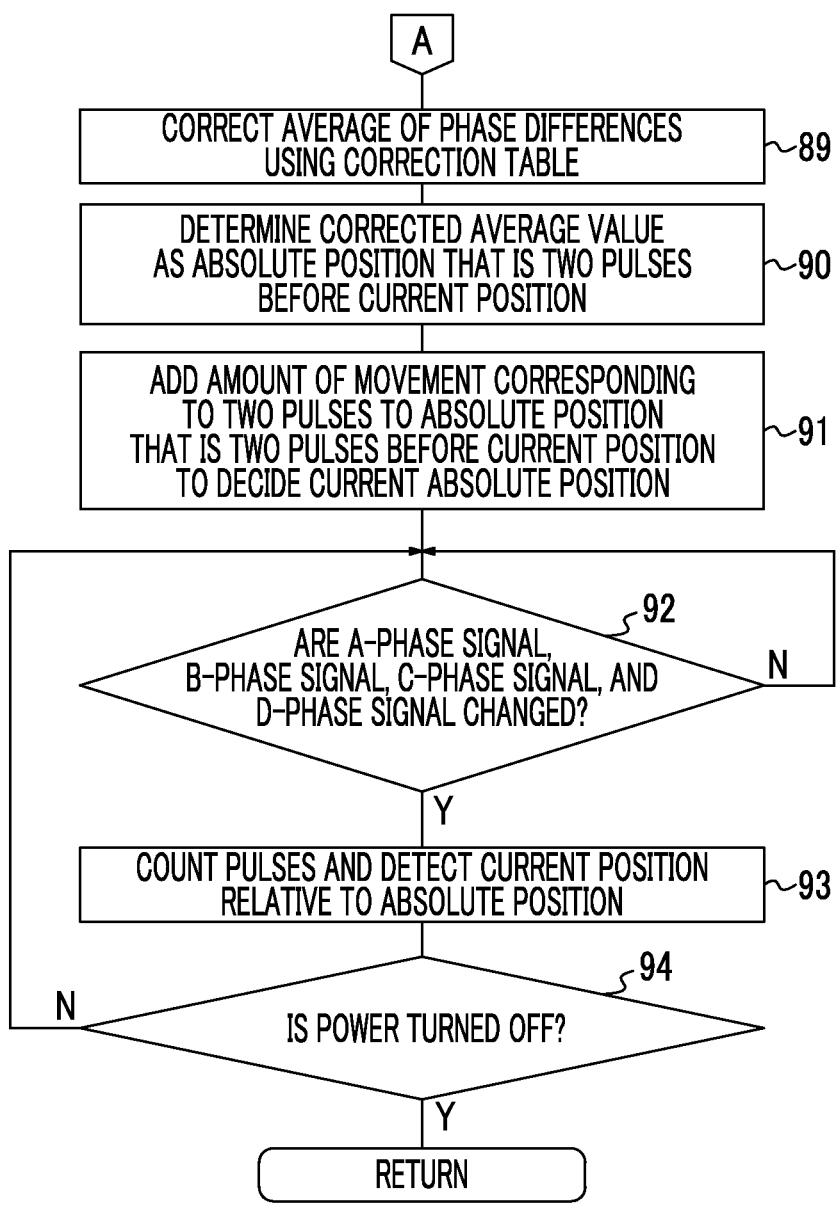
FIG. 16 is a flowchart illustrating the procedure of the zoom lens position detection process.

FIGS. 15 and 16 are flowcharts illustrating the procedure of a zoom lens position detection process. FIG. 17 is a diagram illustrating the waveforms of signals output from the magnetic sensor device 50 when the zoom ring 9 is rotated in one direction. When the rotation direction of the zoom ring 9 is changed, the method is performed from the initial process illustrated in FIG. 15.

When the user turns on the lens barrel, A-phase data, B-phase data, C-phase data, and D-phase data corresponding to the current position of the zoom lens are output from the analog/digital conversion circuits 61A, 61B, 61C, and 61D, respectively. It is assumed that power is turned on at a time T0 illustrated in FIG. 17.

When power is turned on, the phase difference detection circuit 71 checks whether the A-phase data, the B-phase data, the C-phase data, and the D-phase data are changed (Step 81). When the user rotates the zoom ring 9 in one direction after power is turned on and the A-phase data, the B-phase data, the C-phase data, and the D-phase data are changed (YES in Step 81), the phase difference detection circuit 71 determines whether the A-phase data, the B-phase data, the C-phase data, and the D-phase data corresponding to one cycle (one pulse) are detected (Step 82). When the A-phase data, the B-phase data, the C-phase data, and the D-phase data corresponding to one cycle (one pulse) are detected, the A-phase data, the B-phase data, the C-phase data, and the D-phase data corresponding to one cycle (one pulse) are normalized and stored in a memory (not illustrated) included in the phase difference detection circuit 71 (Step 83).

When the A-phase data, the B-phase data, the C-phase data, and the D-phase data corresponding to five pulses are not stored in the memory of the phase difference detection circuit 71 (NO in Step 84), the process is repeated from Step 81.

When the A-phase data, the B-phase data, the C-phase data, and the D-phase data corresponding to five pulses are stored in the memory of the phase difference detection circuit 71 (YES in Step 84), the rotation direction detection circuit 70 detects the rotation direction of the zoom ring 9 (Step 85). The correction table which is used for correction as described above is determined on the basis of the detected rotation direction (Step 86).

Then, the value of arctan(A/B)−arctan(C/D) is calculated for each of the A-phase data, the B-phase data, the C-phase data, and the D-phase data corresponding to five pulses, using the A-phase data, the B-phase data, the C-phase data, and the D-phase data obtained at the time when the amplitude of the A-phase is 180 degrees and the phase difference θ is calculated for each of the five pulses (Step 87).

For example, as illustrated in FIG. 17, the phase difference detection circuit 71 calculates the phase differences θ(1), θ(2), θ(3), θ(4), and θ(5) for each of the first to fifth pulses that are output after power is turned on, using the A-phase data, the B-phase data, the C-phase data, and the D-phase data which are obtained at the times T1, T2, T3, T4, and T5, respectively.

Then, the phase difference detection circuit 71 calculates the average value of the phase differences θ(1) to θ(5) (Step 88).

As described above, the amount of correction corresponding to the calculated average value of the phase differences among the phase differences stored in the determined correction table is read from the determined correction table (Step 89).

The phase difference corrected by the read amount of correction (the correction of the phase difference detected by the phase difference detection circuit 71) is the phase difference in the third pulse. The absolute position of the zoom lens (the absolute position that is two pulses before the current position) corresponding to the phase difference in the third pulse is determined from the phase difference in the third pulse and data in which the design phase difference value stored in the first memory 76 is associated with the position of the zoom lens (Step 90).

Then, the current position detection circuit 79 adds or subtracts the amount of movement corresponding to two pulses to or from the determined absolute position in the rotation direction (the moving direction of the zoom lens) output from the rotation direction detection circuit 70 to decide the absolute position of the zoom lens (Step 91).

For example, when the moving direction of the zoom lens is a direction in which the phase difference θ is changed from a small value to a large value, the current position detection circuit 79 adds the amount of movement corresponding to two pulses to the determined absolute position to decide the absolute position. On the other hand, when the moving direction of the zoom lens is a direction in which the phase difference θ is changed from a large value to a small value, the current position detection circuit 79 substrates the amount of movement corresponding to two pulses from the determined absolute position to decide the absolute position. That is, the current position detection circuit 79 functions as an example of the absolute position calculation section.

The current position detection circuit 79 may output the decided absolute position to a display unit connected to the imaging apparatus body 1 to notify the user of the absolute position.

Then, when the A-phase data and the B-phase data are changed (YES in Step 92), the rotation direction detection circuit 70 compares the A-phase data and the B-phase data to determine the moving direction of the zoom lens, counts the number of pulses of the A-phase data or the B-phase data (for example, the number of pulses at 64-multiplied accuracy), and detects the relative position of the zoom lens having the decided absolute position as a reference position (Step 93).

When the lens barrel 2 is turned off (YES in Step 94), the process ends.

In the lens barrel 2 according to this exemplary embodiment, the current position of the zoom lens is determined on the basis of the corrected value of the average value of the phase differences which are calculated for each of the five pulses output from the magnetic sensor device 50. Therefore, the influence of the uneven magnetization of the magnetic recording scale member 40 or the assembly error of the lens barrel 2 is reduced and it is possible to improve the detection accuracy of the current position.

In the above description of the operation, the average value of the phase differences corresponding to five pulses is used. However, when the average value of the phase differences corresponding to seven pulses is used, the corrected value of the average value of the phase differences θ which are calculated for each of the seven pulses may be treated as a phase difference corresponding to the fourth pulse and the absolute position of the zoom lens in the fourth pulse may be calculated on the basis of the phase difference. Then, a position that deviates from the absolute position by three pulses may be decided as the absolute position.

When the average value of the phase differences corresponding to four pulses is used, the corrected value of the average value of the phase differences θ which are calculated for each of the four pulses may be treated as a phase difference corresponding to the second or third pulse and the absolute position of the zoom lens in the second or third pulse may be calculated on the basis of the phase difference. Then, a position that deviates from the absolute position by one or two pulses may be decided as the absolute position.

When odd-number pulses are used to calculate the average value of the phase differences, the phase difference detection circuit 71 shifts the absolute position corresponding to the corrected value of the average value of the phase differences θ which are calculated for each of the pulses by the quotient when the number of pulses is divided by 2 to decide the final absolute position. When even-number pulses are used, the phase difference detection circuit 71 shifts the absolute position corresponding to the corrected value of the average value of the phase differences θ which are calculated for each of the pulses by "the quotient when the number of pulses is divided by 2" or "(the quotient when the number of pulses is divided by 2)−1" to decide the final absolute position.

It is preferable to use three or more pulses, considering the accuracy of the absolute position. In addition, it is preferable that the above-mentioned number of pulses be equal to the number of pulses (about 5 to 10) which are output from the magnetic sensor device 50 according to the rotation angle of the rotating cylinder 20 (about 10° to 20° when the diameter ϕ of the rotating cylinder 20 is about 80 mm) by one rotation operation. The user can know the absolute position of the zoom lens only by one operation of rotating the zoom ring 9 in a given direction after turning on the lens barrel 20. As a result, an operation of checking the absolute position is simplified.

In the above-described exemplary embodiment, the zoom lens has been described. However, the claimed invention can also be applied to, for example, a focus lens other than the zoom lens.

In the above-described exemplary embodiment, the average value of the phase differences corresponding to five pulses is used. However, the averaging may not be performed and the amount of correction corresponding to the detected phase difference may be read from the correction table and then corrected. In this case, as described above, a phase difference corresponding to the position or the amount of inclination of the lens barrel 2 is detected and the amount of correction corresponding to the phase difference is read.

What is claimed is:

1. An imaging lens barrel comprising:
a barrel body configured to hold an imaging lens so as to be movable in an optical axis direction;
a rotating body configured to rotate in accordance with a movement of the imaging lens and includes a first magnetic scale and a second magnetic scale which are formed in parallel and in which magnetic components with different wavelengths are periodically magnetized in a circumferential direction;
a magnetic sensor device that is provided at a position facing a circumferential surface of the rotating body and includes a first magnetic sensor and a second magnetic sensor, the first magnetic sensor being configured to detect in response to a rotation of the rotating body, from the first magnetic scale, a first phase signal, which is a sine wave, and a second phase signal having a phase shift with respect to the first phase signal, the second magnetic sensor being configured to detect in response to the rotation of the rotating body, from the second magnetic scale, a third phase signal, which is a sine wave, and a fourth phase signal having a phase shift with respect to the third phase signal;
a phase difference calculation section configured to calculate a phase difference between the first phase signal and the third phase signal, using the first phase signal and the second phase signal detected by the first magnetic sensor and the third phase signal and the fourth phase signal detected by the second magnetic sensor;
a correction table memory configured to store a correction table storing a correction value for correcting a difference between the phase difference, which is calculated by the phase difference calculation section at a time when the phase of the first phase signal is 0 degrees in response to the rotation of the rotating body, and a design value in association with the phase difference;
a phase difference correction section configured to read a correction value corresponding to the phase difference calculated by the phase difference calculation section at a time when the phase of the first phase signal is other degrees than 0 degrees in response to the rotation of the rotating body from the correction table stored in the correction table memory and to correct the phase difference calculated by the phase difference calculation section using the read correction value; and
an absolute position calculation section configured to calculate an absolute position of the imaging lens from the phase difference corrected by the phase difference correction section and a predetermined relationship between the phase difference and the absolute position of the imaging lens.

2. The imaging lens barrel according to claim 1,
wherein the phase difference correction section reads a correction value corresponding to the phase difference calculated by the phase difference calculation section at a time when the phase of the first phase signal is 180 degrees in response to the rotation of the rotating body from the correction table stored in the correction table memory and corrects the phase difference calculated by the phase difference calculation section using the read correction value.

3. The imaging lens barrel according to claim 1,
wherein the correction table memory stores two correction tables which indicate the difference between the phase difference calculated by the phase difference calculation section and the design value of the phase difference and are obtained when the imaging lens is moved in different directions, and
the phase difference correction section corrects the phase difference calculated by the phase difference calculation section using the correction table, which corresponds to the moving direction of the imaging lens, of the two correction tables.

4. The imaging lens barrel according to claim 2,
wherein the correction table memory stores two correction tables which indicate the difference between the phase difference calculated by the phase difference calculation section and the design value of the phase difference and are obtained when the imaging lens is moved in different directions, and
the phase difference correction section corrects the phase difference calculated by the phase difference calculation section using the correction table, which corresponds to the moving direction of the imaging lens, of the two correction tables.

5. The imaging lens barrel according to claim 1,
wherein the phase difference correction section corrects the phase difference calculated by the phase difference calculation section except for a phase difference which is obtained from a magnetic component with a large magnetization unevenness among the magnetic components magnetized in the first magnetic scale and the second magnetic scale.

6. The imaging lens barrel according to claim 2,
wherein the phase difference correction section corrects the phase difference calculated by the phase difference calculation section except for a phase difference which is obtained from a magnetic component with a large magnetization unevenness among the magnetic components magnetized in the first magnetic scale and the second magnetic scale.

7. The imaging lens barrel according to claim 3,
wherein the phase difference correction section corrects the phase difference calculated by the phase difference calculation section except for a phase difference which is obtained from a magnetic component with a large magnetization unevenness among the magnetic components magnetized in the first magnetic scale and the second magnetic scale.

8. The imaging lens barrel according to claim 4,
wherein the phase difference correction section corrects the phase difference calculated by the phase difference calculation section except for a phase difference which is obtained from a magnetic component with a large magnetization unevenness among the magnetic components magnetized in the first magnetic scale and the second magnetic scale.

9. A method for controlling an operation of an imaging lens barrel including a barrel body configured to hold an imaging lens so as to be movable in an optical axis direction, and a rotating body configured to rotate in accordance with a movement of the imaging lens and includes a first magnetic scale and a second magnetic scale which are formed in parallel and in which magnetic components with different wavelengths are periodically magnetized in a circumferential direction, the method comprising:

allowing a phase difference calculation section to calculate a phase difference between a first phase signal and a third phase signal, using the first phase signal and a second phase signal detected by a first magnetic sensor and the third phase signal and a fourth phase signal detected by a second magnetic sensor, the first magnetic sensor and the second magnetic sensor being included in a magnetic sensor device which is provided at a position facing a circumferential surface of the rotating body, the first magnetic sensor being configured to detect in response to a rotation of the rotating body, from the first magnetic scale, the first phase signal, which is a sine wave, and the second phase signal, which has a phase shift with respect to the first phase signal, the second magnetic sensor being configured to detect in response to the rotation of the rotating body, from the second magnetic scale, the third phase signal, which is a sine wave, and the fourth phase signal, which has a phase shift with respect to the third phase signal;

allowing a phase difference correction section to read a correction value corresponding to the phase difference, which is calculated by the phase difference calculation section at a time at which the phase of the first phase signal is not 0 degrees in response to the rotation of the rotating body, from a correction table that is stored in a correction table memory and stores a correction value for correcting a difference between the phase difference, which is calculated by the phase difference calculation section at the time at which the phase of the first phase signal is 0 degrees in response to the rotation of the rotating body, and a design value in association with the phase difference and to correct the phase difference calculated by the phase difference calculation section using the read correction value; and allowing an absolute position calculation section to calculate an absolute position of the imaging lens from the phase difference corrected by the phase difference correction section and a predetermined relationship between the phase difference and the absolute position of the imaging lens.

* * * * *